United States Patent [19]
Lan et al.

[11] Patent Number: 5,583,790
[45] Date of Patent: Dec. 10, 1996

[54] COMPUTERIZED LIQUID FLOW-VALVE MONITORING AND CONTROL UNIT

[76] Inventors: Dongping Lan, 147 Matus St., South Plainfield, N.J. 07080; Henry Hofer, 30 Bruce Dr., East Hanover, N.J. 07936; James F. Swon, 12 Twin Park Dr., Brookside, N.J. 07926

[21] Appl. No.: 188,720

[22] Filed: Jan. 31, 1994

[51] Int. Cl.$^6$ ................................................ G06F 17/00
[52] U.S. Cl. ................................................ 364/510
[58] Field of Search .................................. 364/509, 510, 364/479; 210/143, 144; 137/624.11, 487.5; 222/23, 40; 340/603

[56] References Cited

U.S. PATENT DOCUMENTS

| | | | |
|---|---|---|---|
| 4,247,899 | 1/1981 | Schiller et al. | 364/510 |
| 4,295,197 | 10/1981 | Petroff | 364/510 |
| 4,487,065 | 12/1984 | Carlin et al. | 364/509 |
| 4,523,460 | 6/1985 | Strickler et al. | 364/509 |
| 4,597,048 | 6/1986 | Mazur et al. | 364/510 |
| 4,994,984 | 2/1991 | Massimo | 364/509 |
| 5,012,429 | 4/1991 | Lantz | 364/510 |
| 5,058,032 | 10/1991 | Farrell et al. | 364/510 |
| 5,124,934 | 6/1992 | Kawamoto et al. | 364/510 |
| 5,184,309 | 2/1993 | Simpson et al. | 364/510 |

*Primary Examiner*—Ellis B. Ramirez
*Attorney, Agent, or Firm*—William T. Hough, Esq.

[57] ABSTRACT

For system providing a storage and feed source of a particular liquid, and providing a conduit flow of one or more lines to one or more outlet valves separately controllable and operateable and concurrently controllable and operateable for simultaneous flow through any one or more combinations of the plurality of outlet valves, a computer mechanism for separately measuring and storing separately time of flow for each separate one of outlet valves and for each of diverse possible combination of concurrent operations of the outlet valves, and for the computer when activated to do so, to cause a repeat flow for any one of stored one of the outlet valves or for any stored combination thereof.

10 Claims, 2 Drawing Sheets

COMPUTERIZED LIQUID FLOW-VALVE MONITORING AND CONTROL UNIT

This invention relates to a monitory computerized mechanism by which one or more liquid flow valve may be monitored and predictably controlled in future repeats for common volumes of the liquid.

PRIOR ART

Resulting from a patentability search in Class 222, subclassses 133 and 134 and in Class 364, subclass 479, while no relevant prior art was located nor otherwise known by the inventor, prior art of interest are as follow:

1) U.S. Pat. No. 5,109,347 to Quick et al. issued Apr. 28, 1992 directed to a computer controlled mixing device for two or more fluid materials —including for the sequential dispensing of different predetermined mixtures of the fluid to two or more destinations; the invention as defined in that disclosure causing two different liquids to be intermixed and sequentially directed to different ones of a plurality of locations in different concentrations of the intermixed liquid components, one of the liquids being a diluent.
2) U.S. Pat. No. 5,245,548 to Kuan issued Sep. 14, 1993 is directed to a grain cargo automatic metering and dispensing system to register ingredients and quantity of prescribed formula and to simultaneously controlled storage and feeding thereof; the foregoing patent involves non-liquid substances for sucking in and storage, and for empty container take-up and let-off system, and dispensing and inventory systems. The sucking mechanism includes a plurality of heavy-duty suction pumps or the like for sucking grain cargo through wire gause filter. The feeding system includes basic screw rod components. There is also a basic operative component for weighing delivered product. This patent likewise has no bearing nor relevance to the present invention.
3) U.S. Pat. No. 5,203,387 to Howlett et al. issued Apr. 20, 1993 and
4) U.S. Pat. No. 5,083,591 issued Jan. 28, 1992 also to Howlett et al. and likewise relating to paint tinting, each and both relate to a series of tint-injection stations, for cans of varying sizes, associated with a weighing scale—having no relevance to the present invention.
5) U.S. Pat. No. 4,440,314 to Vetter et al. issued Apr. 3, 1994 relates to a computer metering of a primary component pump and computer gauging metered-pumping of one or more other metering pumps relative to the main ingredient measured metering. Such is unrelated and of no relevance to the present invention; and
6) U.S. Pat. No. 4,150,767 issued to Pitches et al. issued Apr. 24, 1979, is directed to dispensing a "blend" of first and second liquids based on flow meters of which the flows thereof are multiplied by a factor equal to the proportion of one liquid to the other—having no relevance to the present invention.

BACKGROUND OF THE INVENTION

For any one or more of the foregoing patents, to the extent that any liquid feed might be involved, the same problems and difficulties to which the present invention is directed, would be present with any one or more of the foregoing prior art patents—which are not directed to the present invention. Accordingly, inaccuracies that the present invention is directed to correct, could be and are likely involved in the practice of the prior inventions.

More particularly, the present invention can be better understood and appreciated by becoming aware of problems that in fact heretofore have plagued the industrial practice of consistently filling diverse receptacles of the same or differing desired volumes with repetitive accurately measured and fed metered volumes of liquid(s) to one vessel alone and/or to a plurality of vessels through a common and/or branched liquid feed flow-conduit(s). First of all, wear and tear and required maintenance and/or the lack thereof to metering pumps, such as typical (but not exclusively) servo pump(s) can and does cause considerable immediate and/or eventual differences in volumes of actual feed-flow monitored and feed therethrough. Even apparently identical pumps often do not consistently have the same nor exact metering capabilities to one another.

However, more common and disruptive problems of consistently inaccurate collected volume(s) of liquid(s) arise from hydrodynamics, or equivalent flow dynamics for non-aqueous liquids, when pumped through irregularly shaped conduit(s) and/or past a series of bends (turns) therein, and differences in flow characteristics based on conduits of different diameters, or of two or more conduits in series of varying inside diameters, taken with difference incurred by different types of metering pump(s). Also, if there are two or more separate outlet valves fed from a common feed conduit, flow dynamics and flow through each of the outlet valves varies considerably depending upon how many of the outlet valves are concurrently open with liquid flowing therethrough, as well as dependent upon potential different rates of flow through two or more of the concurrently open valves permitting concurrent flows. When as is factually the case, the problems exist with even solely a single outlet valve for a consistent always-the-same extent of being a partially or otherwise a totally open valve, the problems—as can be appreciated from the preceding discussion, are compounded geometrically by increasing numbers of outlet valve open concurrently, together with aforestated problems of securing accurate metering where the conduit inside diameter is not standard and/or varies along the way, and/or with bends in the conduit, etc. In the Pharmaceutical and other technical tests for which proven accuracy is required by government regulations, including that of ascertaining exact quantities of tablet dissolving reagent used in dissolving tablets for tests ascertaining dissolution rates of tables used in the pharmaceutical industry, exact and reliable measurements available by the present invention have not heretofore existed to the extent desired and required.

OBJECTS OF THE INVENTION

Objects of the present invention include the overcoming and/or avoiding of problems and/or difficulties of the types discussed above.

Another particular object is to obtain an effective state of the art computer mechanism for ascertaining actual outlet valve volumetric flow under each of potentially variable flow situations for an existing fluid conduit system and its associated outlet valves, and to provide for accurate total volume output for each collected liquid as programmed for any one of the array of potential alternate situations.

Another object is to obtain secure the objects of the invention while maintaining simplicity of operation and/or low cost of production, with an eventual resulting low cost to the buying public.

Another object is to obtain a combination utilizable over a broad spectrum of conditions and for use with a wide variety of conventionally utilized equipment and conduit piping and conventional metering pump(s).

Other objects become apparent from the preceding and following disclosure.

BROAD DESCRIPTION OF THE INVENTION

Broadly the invention is a valve volume of flow metering device for programming future computer-controlled variably-assigned volumes based on parameters of flow from an outlet from which a measured volume is first ascertained. The device as a combination is a combination of several elements, namely a) a liquid source structure(s) and mechanism thereof, b) a valve structure(s) and mechanism thereof, c) a liquid flow conduit structure(s) and mechanism thereof, and a computer volume-monitoring structure(s) and mechanism thereof.

The liquid source structure(s) and mechanism thereof is for the providing of liquid flow of any required liquid that has physical properties (at any appropriate temperature) enabling its flow through prescribed conduit structure(s) and outlet valves associated therewith.

The valve structure(s) and mechanism thereof include valve structure(s) that intermittently open and close as might be required for the introduction of a predetermined volume of a liquid into an appropriate vessel—such as normally an open-top laboratory beaker. The valve structure(s) and mechanism(s) additionally enable flow of the predetermined or prescribed liquid into and from the valve structure, inclusive of typically a conventional outlet valve having mechanisms for electromagnetically or otherwise opening and closing responsive to computer signals directed thereto, such that there occurs a collection therefrom of the liquid fed thereto by the conduits.

The liquid flow conduit structure(s) and mechanism(s) thereof provide for conducting liquid from said liquid source structures above-noted to said valve structure(s) above-noted.

The Computer monitoring and memory and flow-control signaling comparator structure and mechanism thereof monitors and stores at-least one of (a) time period of flow and (b) degree of intermittent opening of said valve structure sufficiently for a predetermined constant time period of predetermined rate of volume-flow. The monitoring and storing of time period(s) is for predetermined time and extent sufficient to result in a predetermined volume of said liquid to flow through the aforestated valve structures. It is also sufficient for subsequently initially turning-on flow when initiated and for thereafter (later) turning-off flow when the predetermined volume has flowed through the aforestated valve structure. It also is sufficient for regulating the future intermittent liquid flow(s) passing from said valve means and liquid flow conduit structure(s) and mechanism(s) thereof to and through and from said valve structure sufficiently and such that future initiated flow(s) of the liquid may be a repeat time(s) of at-least one of said stored time period and the degree of intermittent opening of the valve structure(s) and/or for multiples and/or fractions of the stored time period(s) and/or degree of opening of the valve structure(s).

In one embodiment, the computer monitoring and memory and flow-control signaling comparator structure(s) and mechanisms thereof monitor and store time period of flow for a predetermined amount designated for a predetermined flow of liquid through the liquid flow and based thereon thereafter the computer monitoring and memory and flow-control signaling comparator structures regulating future intermittent liquid flow passing from said valve structure(s) and liquid flow conduit structure(s) through and from the valve structure(s) in order make possible to repeat intermittently the time of flow identical to the computer-stored time.

In a first preferred embodiment as an improvement on the above-described broad invention, the liquid flow conduit structure(s) (and mechanism(s) thereof is/are connected/ assembled in a conventional manner as to simultaneously feed said liquid to and through a plurality of the above-described valve structure(s). Additionally in this preferred embodiment, the computer monitoring and memory and flow-control signaling comparator structure(s) include(s) logic structure(s) (and mechanism(s) thereof of a conventional nature to an extent necessary for a storing time-record(s) of the particular time(s) of flow(s) of the above-described predetermined amount; such determination(s) is done by the computer separately for each of the plurality for each combination of two or more thereof concurrent on-flow operation a) effecting the simultaneous feed and b) separately identifying and storing in computer memory the essential data as to which and each of the plurality has its separate monitored time. Additionally the computer monitoring and memory and flow-control signaling comparator structure(s) above-described conventionally provide for future computer activations that selectively utilizing the stored data to initiate a repeating of the same identical volume of flow of the liquid for any designated one of the combinations of concurrent valve(s) flow(s) for any one or more identified ones of the plurality.

In a second preferred embodiment as an improvement on the first preferred embodiment, there is included video monitoring structure(s) (and mechanism(s) thereof) means for the monitoring of data concurrently from one or more of the above-noted plurality. In this second preferred embodiment, the video monitoring structure(s) (and mechanism(s) thereof) additionally monitor data stored in memory of the logic structure(s) for and/or from any one or more of the above-stated plurality.

In a third preferred embodiment as an improvement on the second preferred embodiment, the computer monitoring and memory and flow-control signaling comparator structure(s) additionally intermittently open and subsequently close the valve structure(s) in accord with the stored time period(s) and/or the stored degree of intermittent opening(s) of the valve structure when the computer monitoring and memory and flow-control signaling comparator structure(s) is/are initiated by an operator.

In a fourth preferred embodiment as an improvement on the third preferred embodiment, the computer monitoring and memory and flow-control signaling comparator structures include(s) mass-detection structure(s) (and mechanism thereof) that detect and terminate flow of aforestated liquid through the valve structure(s) when the predetermined volume(s) has/have been reached; this is accomplished by its alternately sending activation and deactivation signals to the valve structure(s) (and mechanism(s) thereof).

In a fifth preferred embodiment as an improvement on the broad generic invention above-described, there is the same improvement as for the fourth preferred embodiment.

In a sixth preferred embodiment as an improvement on the fifth preferred embodiment, the computer monitoring and memory and flow-control signaling comparator structure(s) include(s) mass-detection structure(s) (and mechanism thereof) that detect degree (extent) and terminates flow of the aforestated liquid through the valve structure(s) when the predetermined volume has been reached. This is accomplished by the computer monitoring and memory and flow-control signaling comparator structure(s) thereupon/thereafter alternatively sending activation and deactivation signals to said valve structure(s).

In a seventh preferred embodiment as an improvement on the sixth preferred embodiment, at-least one of the aforestated valve structure(s) and/or the computer monitoring and memory and flow-control signaling comparator structure(s) includes switch structure(s) (and mechanism(s) thereof) that detects if and when the predetermined volume has completed its flow in that amount through the aforestated valve structure(s). The aforestated valve structure(s) and/or the computer monitoring and memory and flow-control signaling comparator structure(s) additionally cause(s) flow of the aforestated liquid to terminate when (at such point in time that) the predetermined volume has flowed through the switch immediately following any prior setting of memory and/or of thereafter any prior initiation of flow of the aforestated liquid through the valve structure(s).

In an eighth preferred embodiment as an improvement on the seventh preferred embodiment, the aforestated switch structure(s) include(s) downwardly-extending at-least two spaced-apart electrodes. Additionally, the aforestated liquid at-least one of a) is inherently an electrolyte and 2) includes a predetermined number of an electrolyte, in an amount and/or to a degree sufficiently to conduct an electrical-current signal(s) between said at-least two spaced spaced-apart electrodes by electrolyte serving to completing electrical flow circuit therebetween. Additionally, the two spaced-apart electrodes are an in-series part of a conventional combination turn-off mechanism (structure(s)) adapted to turn-off and terminate flow of the aforestated liquid through the valve structure(s) when both of the electrodes are in sufficient contact with the aforestated liquid collected, as to complete electrical circuit between and through both of the electrodes.

In a ninth preferred embodiment as an improvement on the broad invention previously described, there is the same improvement as that of the seventh preferred embodiment.

In a tenth preferred embodiment as an improvement on the ninth preferred embodiment, there is the same improvement as that of the eighth preferred embodiment.

The invention may be better understood by making reference to the following drawings of the Figures.

THE FIGURES

FIG. 1 diagrammatically and symbolically illustrates a first embodiment of the invention graphically, for elements of the invention, including interconnecting connecting lines of circuitry, vessels, supporting substrate for vessels, and volume measuring devices.

FIG. 2 diagrammatically and symbolically illustrates a second embodiment of the invention, being largely identical to that of the first embodiment, apart from differing types of flow valves and different computer/comparator programming, to result in a different mechanism of accomplishing a designated premeasured flow, as set-forth in greater detail below, as an alternate embodiment.

DETAILED DESCRIPTION

Figure 1:
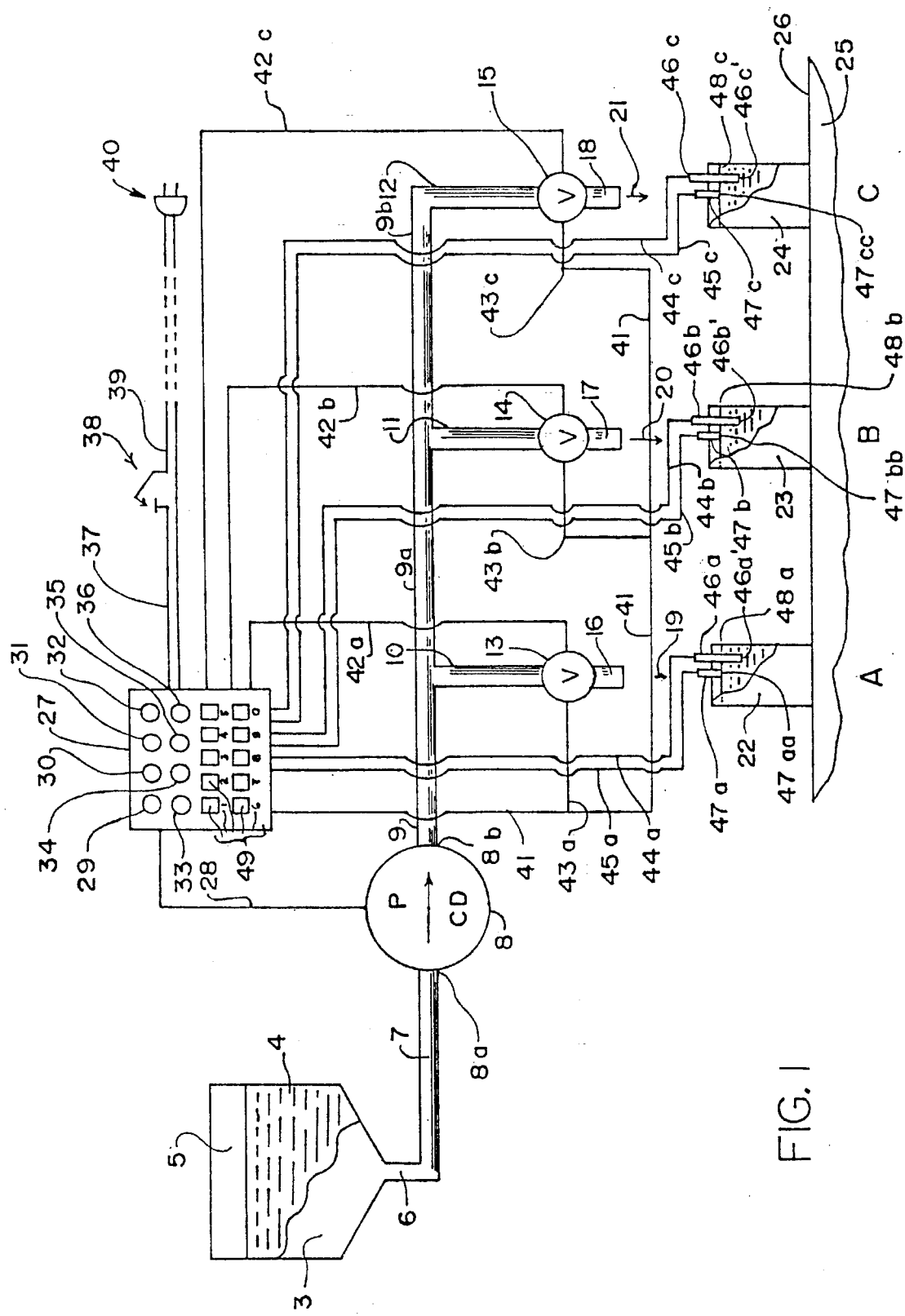
Figure 2:
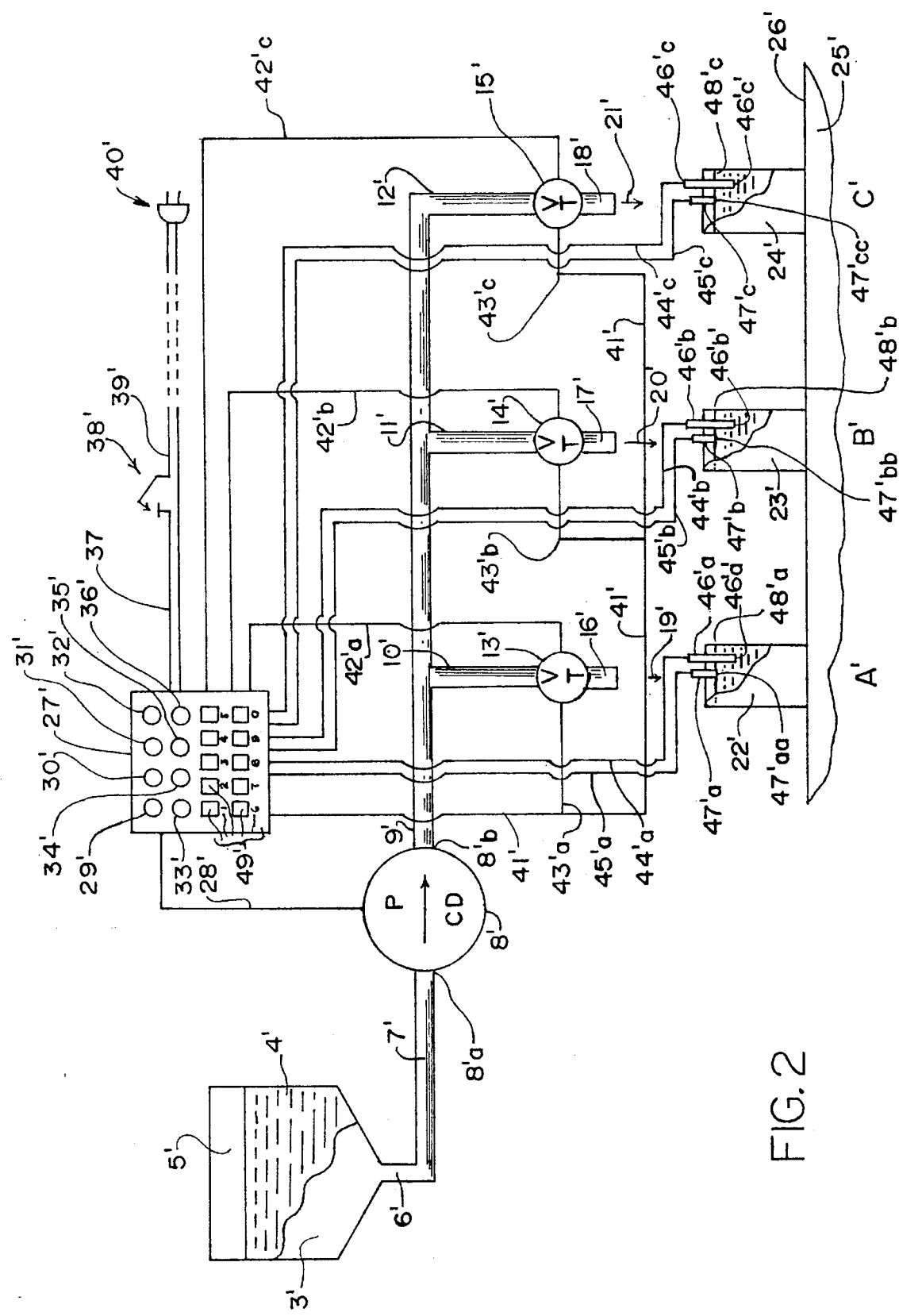

FIGS. 1 and 2 illustrate alternate embodiments of the same invention.

As set-forth in the foregoing broad description, in one embodiment—now illustrated in FIG. 1, the state-of-the-art computer and/or comparator 27 thereof when activated to receive a presetting of the standard data for a particular flow valve such as state-of-the-art flow valve 13), is programmed to receive and store a predetermined time period for future constant flow of liquid thereafter through that particular flow valve (such as flow valve 13), of the same future requested flow, and is further programmed to adjust that time period in multiples and/or in fractions of the standard time period, in accord with requested future flow punched-in manually on coding keys for a greater or lesser volume of flow desired.

In contrast to the combination of FIG. 1, the combination of FIG. 2 is based on normally a constant time of flow, the setting of a predetermined standard for future flows (on the basis of subsequent punching in of instruction(s) intermittently (by typically state of the art keyboard keys 49 for one or more indicia 1 through 9 and 0), for desired quantity or quantities of flow through and from fixed/constant state-of-the-art valves (such as valve 13'), for FIG. 2 combination, is based on changing the degree to which the variable flow valve (such as conventional state-of-the-art variable flow or throttle valve 13') that determines flow over a predetermined set period of time by the extent (degree) to which the valve is opened by instruction from the computer and/or comparator 27' thereof when a desired volume is manually punched-in by an operator on the input keys 49' (such as key 1 through 9 and/or 0—which with 1+0 would be ten, or 3+0 would be thirty, etc.).

For each and/or both of the embodiments of FIGS. 1 and 2, the computer(s) and/or comparator(s) thereof may use present and/or future updated computer(s) and comparator(s), but the present invention not being in the precise nor particular nature of any specific particular computer and/or comparator and memories or other mechanism thereof, the present invention making use of conventional presently existing prior art and state of the art technology. Everything referred to in this disclosure as to function(s) of the computer and/or comparator thereof is/are well within known existing capability(ies) and technicalities and circuitries of state of the art computers already existing and available and functional, utilizable as element(s) of the present invention and/or combination(s) thereof; any one or more computer(s) and/or comparator thereof, are encompassed as included within the language computer and/or comparator of the presently disclosed invention.

More particularly, the FIG. 1 embodiment illustrates a feed reservoir-vessel 3 in side view with partial cut-away revealing the contained electrolyte liquid (or at-least a part there of being an electrolyte liquid intermixed) contained within interior space 5, for typically exiting through bottom outlet conduit 6 into feed conduit 7 to the constant-delivery pump (a metering pumps delivering a predetermined constant rate of flow of the liquid therethrough) 8 of the liquid fed into pump inlet 8a and driven from the pump outlet 8b. The impelled liquid passes from the pump outlet 8b into and through the serially consecutive conduits 9, 9a and 9b whenever one or more of the outlet valves 13, 14 and/or 15 have been concurrently opened fully (normally). It should be noted that it is not essential that a valve be fully opened, but for this embodiment, the valve must each time be opened to the same extent as the degree of opening when the standard time of flow is set/programmed into memory the computer and/or comparator thereof.

In this FIG. 1 embodiment, when valve 13 is opened, liquid 4 conveyed by conduit 9 passed through serially consecutive conduit 10 through valve 13 and out of spout/ spout-outlet 16 as a liquid stream passing along downwardly falling path 19 into vessel 22. There are comparable serially consecutive conduits 9 and 9a and 11 to valve 14 and spout 17, and likewise serially consecutive conduits 9, 9a, 9b and 12 to valve 15 and spout 18. Liquid 4 from spout 17 falls along path 20 into vessel 23, and liquid 4 from spout 18 falls along path 21 into vessel 24. The valve 13 is alternately turned-on by a valve-opening signal along electrical lead 42a from the computer and/or comparator 27, and is subsequently turned-off by at the end of a time period previously set and stored in the computer and/or comparator 27 by a subsequent signal also through lead 42a. Return-leads therefrom are sequential electrical circuitry lead 43a and 41. Likewise, for the valve 14, there are the input activation signal lead 42b and return serially consecutive leads 43b and 41, and for the valve 15 there are the input activation signal lead 42c and return serially consecutive leads 43c and 41.

For each separate vessel 22, 23 and 24, there is a separate set of paired electrodes. For vessel 22 there are paired electrodes, namely extended-length long electrode 46a and shorter/short electrode 47a, supported (by a conventional state of the art support structure not illustrated) in a predetermined positions illustrated. The bottom end 46a' of the electrode 46a extends downward to a location (point) below a predetermined level 48a of vessel 22 of pre-known volume at the level 48a. The electrode bottom end 47aa of electrode 47a is at the exact position and aligned with the above-state predetermined level 48a. Accordingly, by preprogramming, when the liquid 4 flowing along spout-dropping path 19 fills the vessel sufficiently to initiate electrically conductive contact with the electrode bottom end 47aa sufficiently to complete circuitry through the collected liquid in vessel 22 as to conduct electrical signal current from electrode 46a to electrode 47a, an already activated signal in lead 44a becomes returned by lead 45a to the computer/comparator 27 which immediately (substantially instantaneously/simultaneously) thereupon send a valve-closing signal through lead 42a to the valve 13, causing the valve 13 to immediately (substantially instantaneously/simultaneously) turn to the off position to close the valve 13—thereby terminating further feed of liquid 4 into the vessel 22.

For the valve 14 as controlled in flow by the paired electrodes 47b and 47b for vessel 23, and likewise for the valve 15 as controlled in flow by the paired electrodes 47c for vessel 24, the computer/comparator likewise controls input of liquid 4 fed into those vessel 23 and 24.

With regard to the programming of the computer/comparator 27, there are possible many equivalent programs for the same or different computer/comparators utilizable conventionally for the present invention, and the following is solely a typical example of programming—set forth in informal non-computer language.

Accordingly, as purely symbolic of a typical operation and program consistent with the objects of the invention and foregoing elements, a vessel 22 is already marked or optionally is marked by the operator at a level thereon at which volume of liquid would be a predetermined known volume (of typically 100 ml). Next, the electrode 47a is upwardly and/or downwardly adjusted to the extent necessary such that the electrode bottom end 47aa is stably fixedly positioned and anchored at the known level of 100 ml. for the collection vessel 22 as above-noted already marked. Next sequentially, the volume programming button 29 is pressed to cause the computer/comparator to be receptive of data as follows; immediately thereafter sequentially, the keyboard button 0 and thereafter 1 (resulting number thus-far being 01) is punched to identify the situation A (shown on FIG. 1 as associated with vessel 22) and thereafter four additional digit are punched, such as 0100—indicative of 100 ml. to be collected—the entire number thus now being 010100; next immediately sequentially thereafter, the operator punches turn-on activation button 30 which simultaneously activates input-signal through signal input lead 44a and simultaneously activates pump 8 and simultaneously opens valve 13 whereby flow of liquid 4 becomes initiated along downward path 19 into vessel 22. When the level of liquid 4 thereby and thereupon collected in vessel 22 reaches a level sufficient to touch electrode bottom end 47aa by which the signal is passed from electrode 47a through the collected liquid through the liquid 4 to electrode 47a and through return lead 44a to the computer/comparator 27 whereupon immediately the computer comparator simultaneously terminates (turns-off) the pump 8 and closes the valve 13 and stores in its memory bank the total time-period of flow prior up to the point in time that the signal passed through the collected liquid from electrode 46a to the electrode 47a. Thereafter, by virtue of preprogramming of the computer/comparator, for any keyboard six-digit number of which the first two digits are 01 (followed by volume-desired four-digits), sequentially followed by punching the turn-on activation button 30 the computer will turn on the pump 8 and open the valve 13 for a period to one of a fraction of the stored period or a multiple of the stored period—as determined by the volume digits (last four digits punched) as compared to the preset standard of afore-stated (typical) stored standard amount of 100 ml (stored digits 0100); accordingly, if the desired liquid flow is 500 ml, the total digits punched on the keyboard would be 010500 whereby liquid would flow from spout 16 for a time period sufficient for 500 ml to collect in the collection vessel 22 or other larger vessel substituted thereafor. In the alternative, if 010020 where punched on the keyboard 49 into the computer/comparator 27, followed by pressing the activation button 30, the liquid 4 would thereafter flow from spout 19 for a period of time necessary to collect the 20 ml in an appropriate vessel. The time required to collect the 20 ml would be 20% of the time that had been required for the preset standard time of 100 ml. The preset standard for spout 16, which would be designated 010100 (as noted-above) on the computer/comparator 27, for 100 ml time of flow period for valve designated 01 on the computer—corresponding to afore-identified valve 13 of situation A, will remain indefinitely for an infinite number of future uses for different volume, up to and until the preset button 29 is again punched in conjunction with thereafter punching-in an 01 as the two first digits. Typically, the activation button 29 serves to "clear" an erroneous and/or accidental earlier striking of the preset button 29 prior to completion of the keyboard six-digit number. Likewise, punching the preset button 29 at any time after beginning but prior to pressing the activation button 27 will serve to "clear" prior punched numbers, thereafter requiring beginning anew any intended action by the computer/comparator 27.

For the situation B identified for FIG. 1, i.e. for the valve 14 and paired electrodes 46b and 47b, and likewise for the situation C identified for valve 15 and paired electrodes 46c and 47c, the same preprogramming and thereafter procedural use for any of desired volume collections would be followed as described-above for the situation A.

With regard to further state of the art conventional-type programming for purposes of the present invention, if and when more than one valve is intended to be operated substantially simultaneously, at any time when—for example—the A situation (aforenoted) is in flow operation filling a vessel, any one of any remaining valves may be simultaneously (overlappingly) activated merely by (if using a prior presetting thereof) using the keyboard to punch-in 02 (for example for the situation B) followed by the volume desired such as 1040 for a total figure 021040 to collect 1040 ml from valve 14/spout 17, and thereafter (for typically situation C) typing in on the keyboard 03 followed by the volume desired (such as 350 ml) for a total figure 030350 to collect that volume from valve 15/spout 18, in order to make continued precise accuracy possible, alternative additional programming of this computer/comparator is necessary and possible, typically as follows. Whenever it is intended or programmed for both a concurrent feeding a plurality of valves through common conduit(s) and for simultaneous opening of two or more of the valves thereof, as typically illustrated in each of FIGS. 1 and 2, a typical addition procedure is to program the computer/comparator 27 to recognize such particular situation—such as simultaneous running of both valves 13 and 14 for their independent programmed volumes; in order for the computer to do this, a separate presetting for that specific combination would have to be preprogrammed, with both valves concurrently on for with simultaneous flow through both valves, such as valves 13 and 14 for their independently specified volumes, and the computer would be programmed to record a separate valve turn-off time-period for each valve, with the final (second) time period giving the final memory-data for this particular memory storage. The Computer/comparator typically is programmed to receive an additional six digits (totaling twelve digits) prior to pressing the activation button. Where three valves are intended to overlap in operation, a separate memory setting would be for the three-way combination, typing on the keyboard buttons a plurality of eighteen digits to thereby encompass all three situations A, B and C. The same procedure would be required for setting-up (preprogramming for a combination of simultaneous valve situations B and C, the same as is separated required for simultaneous valve situations A and B above described. While the situations represented in FIG. 1 are mere A, B, C, and combinations thereof such as simultaneously A, B and C and/or A and B, and/or A and C, and B and C, solely the total number of valves from a common conduit determines the total number of possible and/or required preprogrammings. On the other hand, if each valve has a separate and independent feed line/conduit from the same feed reservoir vessel 3 or from a separate other reservoir vessel, solely one preprogramming is necessary. The reason for the multiple preprogramming being required where a plurality of valves are fed from the same conduit such as conduits 7 and/or 9, arises from aforestated problems of differing flow dynamics where flow pressures differ when more than one outlet is drawing from a common line of limited flow capacity.

While once programmed, reprogramming is not required for nor after each use thereafter, but preprogramming should be repeated anew after an ascertainable number of uses, and/or after a prolonged non-use and/or after an extended period of extensive use, because of factors of wear and tear and of changed flow characteristics therefrom, or from residual deposits and/or other indiscernible factors that could and often realistically will be found to have changed the actual amount collected as compared to the original last presetting for that particular valve and/or combinations with other valves for concurrent simultaneous use. Assured accuracy is more probable with frequency repeat programming for the accurate measured amount for the memory of the computer/programmer 27.

FIG. 2 combination programming is accomplished the same as that for FIG. 1, the sole difference being that the data stored and acted on and the mechanism differ slightly from that of FIG. 1. In the FIG. 2 embodiment, the computer/comparator 27 regulates and causes changes in the degree/extent to which a particular valve is opened during activation for flow of the liquid 4' through that valve. The computer turns-on the opening signal to a valve for solely a time duration required to open a valve to a predetermined extent necessary to fill a vessel within a constant period of time. When the signal from the electrode 47' (for example) indicates that volume has been reached, the computer records into its memory to what extent the valve was open during that time period, and the time period is recorded as the period of each separate initiation thereafter. Concurrently, the computer/comparator 27 is programmed to proportionately open the valve wider for keyboard future demanded larger specific volume during the same time period, or to fractional-proportionately smaller degree/extent of opening for keyboard specific smaller volume during the same time period. Similar preprogramming will be made for each and every combination of concurrent use of two or more of the valves during and for simultaneous flow from more than one of the spouts. Accordingly, in the FIG. 2 embodiment, the variable is the extent of valve opening during a constant time period of the securing of a known volume, as compared to the FIG. 1 embodiment being dependent upon a variable time period of flow through a constant-flow (always open to the same extent) valve.

By the present invention, accordingly, based on a preset known volume of flow during a computer/comparator remembered time of flow, the same or differing volumes may be drawn by merely keyboard punching in the desired valve for operation and the volume desired, and the liquid will pour from the spout for the time necessary to result in the demanded volume, always with a maximum of accuracy not affected by unknown variables of conduit size, pump pressure, conduit configuration, deposits within the conduits, and the like.

It is within the scope of the invention to make such variations and modifications and substitutions of equivalents as would be obvious to a person of ordinary skill in this particular art.

I claim:

1. A valve volume of flow metering device for preascertained liquid volume comprising in combination:

a) a liquid source means for providing liquid flow of a liquid;

b) a valve means including valve structure, for intermittently opening and closing, and for enabling flow of said liquid into and from said valve structure, for collection therefrom;

c) a liquid flow conduit means for conducting liquid from said liquid source means to said valve means; and d) a computer volume-monitoring and memory and flow-control signaling comparator means for monitoring, storing at-least one of (a) time period of flow and (b) degree of intermittent opening of said valve structure sufficiently for a predetermined constant time period of predetermined rate of volume-flow, sufficient to result in a predetermined volume of said liquid and for initially turning-on flow when initiated and for subsequently turning-off flow when said predetermined volume has flowed through said valve structure, and for regulating future intermittent liquid flow passing from said valve means and liquid flow conduit means through and from said valve means to be for a repeat time of flow identical to at-least one of said stored time period and said degree of intermittent opening of said valve structure.

2. The valve volume of flow metering device for preascertained liquid volume of claim 1, in which at-least one of said valve means an said computer volume-monitoring and memory and flow-control signaling comparator means includes a switch means for detecting detecting if and when said predetermined volume has flowed through said valve structure and for causing flow of said liquid to terminate when said predetermined volume has flowed through said switch immediately following any prior initiation of flow of said liquid through said valve structure.

3. The valve volume of flow metering device for preascertained liquid volume of claim 1, in which said computer volume-monitoring and memory and flow-control signaling comparator means is additionally for intermittently opening and subsequently closing said valve means in accord with said stored time period and said stored degree of intermittent opening of said valve structure when said computer monitoring and memory and flow-control signaling comparator means is initiated by an operator.

4. The valve volume of flow metering device for preascertained liquid volume of claim 2, in which said computer volume-monitoring and memory and flow-control signaling comparator means includes a mass-detection means for detecting and terminating flow of said liquid through said valve structure when said predetermined volume has been reached by alternately sending activation and deactivation signals to said valve means.

5. The valve volume of flow metering device for preascertained liquid volume of claim 4, in which at-least one of said valve means and said computer volume-monitoring and memory and flow-control signaling comparator means includes a switch means for detecting if and when said predetermined volume has flowed through said valve structure and for causing flow of said liquid to terminate when said predetermined volume has flowed through said switch immediately following any prior initiation of flow of said liquid through said valve structure.

6. The valve volume of flow metering device for preascertained liquid volume of claim 5, in which said switch means includes downwardly-extending at-least two spaced-apart electrodes and in which said liquid at-least one of a) is inherently an electrolyte and b) includes a predetermined amount of an electrolyte, sufficiently to conduct an electrical signal between said at-least two spaced spaced-apart electrodes by completing electrical flow circuit therebetween, and in which said at-least two spaced-apart electrodes are an in-series part of a turn-off mechanism adapted to turn-off and terminate flow of said liquid through said valve structure when electrical circuit though said valve structure.

7. The valve volume of flow metering device for preascertained liquid volume for programming future computer-controlled variably-assigned volumes based on parameters of flow from an outlet from which a measured volume is first ascertained, comprising in combination:

a) a liquid source means for providing liquid flow of a liquid;

b) a valve means including valve structure, for intermittently opening and closing, and for enabling flow of said liquid into and from said valve structure, for collection therefrom;

c) a liquid flow conduit means for conducting liquid from said liquid source means to said valve means; and d) a computer volume-monitoring and memory and flow-control signaling comparator means for monitoring, storing at-least one of (a) time period of flow and (b) degree of intermittent opening of said valve structure sufficiently for a predetermined constant time period of predetermined rate of volume-flow, sufficient to result in a predetermined volume of said liquid and for initially turning-on flow when initiated and for subsequently turning-off flow when said predetermined volume has flowed through said valve structure, and for regulating future intermittent liquid flow passing from said valve means and liquid flow conduit means through and from said valve means to be for a repeat time of flow identical to at-least one of said stored time period and said degree of intermittent opening of said valve structure, in which said liquid flow conduit means is connected to simultaneously feed said liquid to and through a plurality of said valve means, and in which said computer volume-monitoring and memory and flow-control signaling comparator means includes logic means for storing times of flow of said predetermined amount separately for each of said plurality for each combination of two or more thereof concurrent on-flow operation effecting said simultaneous feed and to separately identify and store in computer memory which and each of said plurality has its separate monitored time, and for in the future when said computer volume-monitoring and memory and flow-control signaling comparator means is activated, repeating flow for any one or more identified ones of said plurality.

8. The valve volume of flow metering device for preascertained liquid volume of claim 7, including video monitoring means for monitoring data being currently monitored from one or more of said plurality, and for monitoring data stored in memory of said logic means for one or more of said plurality.

9. The valve volume of flow metering device for preascertained liquid volume of claim 8, in which said computer volume-monitoring and memory and flow-control signaling comparator means is additionally for intermittently opening and subsequently closing said valve means in accord with said stored time period and said stored degree of intermittent opening of said valve structure when said computer monitoring and memory and flow-control signaling comparator means is initiated by an operator.

10. The valve volume of flow metering device for preascertained liquid volume of claim 9, in which said computer volume-monitoring and memory and flow-control signaling comparator means includes a mass-detection means for detecting and terminating flow of said liquid through said valve structure when said predetermined volume has been reached by alternately sending activation and deactivation signals to said valve means.

* * * * *